(12) United States Patent
Hammers et al.

(10) Patent No.: US 9,505,041 B2
(45) Date of Patent: Nov. 29, 2016

(54) OPTIMIZED AIRBORNE COMPONENT EXTRACTOR

(71) Applicant: Illinois Tool Works Inc., Glenview, IL (US)

(72) Inventors: Brian J. Hammers, Appleton, WI (US); Bradley G. Carman, Chicago, IL (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 641 days.

(21) Appl. No.: 13/767,643

(22) Filed: Feb. 14, 2013

(65) Prior Publication Data

US 2013/0244555 A1    Sep. 19, 2013

Related U.S. Application Data

(60) Provisional application No. 61/737,653, filed on Dec. 14, 2012, provisional application No. 61/611,885, filed on Mar. 16, 2012.

(51) Int. Cl.
| | |
|---|---|
| *B08B 15/02* | (2006.01) |
| *F24F 7/007* | (2006.01) |
| *B08B 15/00* | (2006.01) |
| *B23K 9/32* | (2006.01) |
| *B23K 37/08* | (2006.01) |

(52) U.S. Cl.
CPC ............... *B08B 15/02* (2013.01); *B08B 15/00* (2013.01); *B08B 15/002* (2013.01); *B23K 9/325* (2013.01); *B23K 26/142* (2015.10); *B23K 37/08* (2013.01); *F24F 7/007* (2013.01)

(58) Field of Classification Search
CPC ...... B08B 15/04; B08B 15/002; B08B 15/02

USPC .............................................. 454/60, 63, 56
See application file for complete search history.

(56) References Cited

U.S. PATENT DOCUMENTS

| | | | |
|---|---|---|---|
| 2,185,919 A | 1/1940 | Kurth | |
| 2,210,458 A * | 8/1940 | Keilholtz | F24F 1/025 15/345 |
| 2,289,474 A | 7/1942 | Anderson | |
| 2,367,104 A | 1/1945 | Demuth | |
| RE24,637 E | 4/1959 | Wulle | |

(Continued)

FOREIGN PATENT DOCUMENTS

| | | |
|---|---|---|
| AU | 637737 | 6/1993 |
| CH | 682512 | 9/1993 |

(Continued)

OTHER PUBLICATIONS

International Search Report & Written Opinion of PCT/US2012/022599 mailed May 2, 2012.

(Continued)

*Primary Examiner* — Steven B McAllister
*Assistant Examiner* — Jonathan Cotov
(74) *Attorney, Agent, or Firm* — Fletcher Yoder P.C.

(57) ABSTRACT

A component extractor system includes a source of a positive pressure air stream and a source of a negative pressure air stream. Conduits convey the air streams to and from a work area where one or more nozzles create a capture region and draw airborne components into the system. The system is optimized in terms of flow ratios, dimensions of the conduits and elements of the nozzle, and so forth.

12 Claims, 13 Drawing Sheets

(56) References Cited

U.S. PATENT DOCUMENTS

| | | | |
|---|---|---|---|
| 2,910,558 A | 10/1959 | Engelhardt | |
| 3,318,227 A | 5/1967 | Nelson | |
| 3,364,664 A | 1/1968 | Doane | |
| 3,430,551 A | 3/1969 | Hauville | |
| 3,487,767 A | 1/1970 | Kristiansen | |
| 4,016,398 A * | 4/1977 | Herrick | B08B 15/04 219/136 |
| 4,043,257 A * | 8/1977 | Aaberg | B08B 15/02 454/188 |
| 4,158,462 A * | 6/1979 | Coral | B08B 15/002 285/144.1 |
| 4,160,407 A * | 7/1979 | Duym | B08B 15/023 126/299 R |
| 4,163,650 A * | 8/1979 | Watson | B03B 3/36 15/339 |
| 4,450,756 A | 5/1984 | Kling | |
| 4,493,970 A | 1/1985 | Rieppel | |
| 4,502,375 A * | 3/1985 | Hignite | B08B 15/023 454/56 |
| 4,552,059 A * | 11/1985 | Potter | F24C 15/2021 126/299 D |
| 4,607,614 A | 8/1986 | Higashino | |
| 4,717,805 A | 1/1988 | Miyagawa | |
| 4,905,716 A * | 3/1990 | Hubbard | A45D 7/00 132/212 |
| 5,058,490 A | 10/1991 | Sodec | |
| 5,069,197 A | 12/1991 | Wisting | |
| 5,223,005 A | 6/1993 | Avondoglio | |
| 5,263,897 A * | 11/1993 | Kondo | F24C 15/2028 454/189 |
| 5,281,246 A * | 1/1994 | Ray | B01D 46/002 55/302 |
| 5,395,410 A | 3/1995 | Jang | |
| 5,410,120 A | 4/1995 | Taylor | |
| 5,427,569 A | 6/1995 | Plymoth | |
| 5,540,214 A | 7/1996 | Boudreault | |
| 5,713,346 A * | 2/1998 | Kuechler | F24C 15/2021 126/299 D |
| 5,718,219 A | 2/1998 | Boudreault | |
| 5,890,484 A | 4/1999 | Yamada | |
| 6,037,725 A | 3/2000 | Tolbert, Jr. | |
| 6,099,607 A * | 8/2000 | Haslebacher | F24F 3/1607 55/356 |
| 6,332,837 B1 * | 12/2001 | Wilk | B08B 15/04 219/137.41 |
| 6,358,137 B1 * | 3/2002 | Threlfall | B08B 15/023 454/61 |
| 6,607,573 B1 * | 8/2003 | Chaurushia | B01D 46/12 55/356 |
| 6,616,720 B1 * | 9/2003 | Smith | B08B 15/002 454/187 |
| 6,620,038 B1 * | 9/2003 | Kikuchi | F24F 7/06 126/299 D |
| 6,632,132 B1 * | 10/2003 | Kikuchi | F24C 15/2028 126/299 D |
| 6,780,213 B2 * | 8/2004 | Chang | B01D 46/42 454/187 |
| 7,000,634 B2 | 2/2006 | Lindborg | |
| 7,959,696 B2 * | 6/2011 | Martic | F24C 15/2028 126/299 F |
| 8,176,766 B1 | 5/2012 | Ruiz | |
| 8,211,194 B2 | 7/2012 | Takayanagi | |
| 8,312,873 B2 * | 11/2012 | Gagas | F24C 15/2035 126/299 D |
| 8,460,417 B2 * | 6/2013 | Reid | B08B 15/04 55/356 |
| 8,892,222 B2 | 11/2014 | Simms | |
| 2002/0039881 A1 * | 4/2002 | Coral | B08B 15/002 454/67 |
| 2003/0181158 A1 * | 9/2003 | Schell | F24F 3/0442 454/229 |
| 2005/0170767 A1 * | 8/2005 | Enzenroth | B08B 15/002 454/36 |
| 2005/0204582 A1 | 9/2005 | Rossi | |
| 2006/0157048 A1 | 7/2006 | Heilman | |
| 2008/0305731 A1 * | 12/2008 | Reid | B01D 45/08 454/65 |
| 2009/0088060 A1 | 4/2009 | Arnold | |
| 2009/0321403 A1 * | 12/2009 | Brenneke | B23K 37/006 219/137.41 |
| 2010/0206799 A1 | 8/2010 | Leavitt | |
| 2010/0282728 A1 * | 11/2010 | Cole | B08B 15/04 219/133 |
| 2012/0193334 A1 | 8/2012 | Mehn | |
| 2013/0122795 A1 | 5/2013 | Hammers | |
| 2013/0162177 A1 | 6/2013 | Hofsdal | |
| 2014/0213164 A1 | 7/2014 | Leisner | |
| 2014/0214213 A1 | 7/2014 | Rockenfeller | |

FOREIGN PATENT DOCUMENTS

| | | |
|---|---|---|
| CN | 2146665 | 11/1993 |
| CN | 2225253 | 4/1996 |
| CN | 2413708 | 1/2001 |
| CN | 1384909 | 12/2002 |
| CN | 101327109 | 12/2008 |
| CN | 101526239 | 9/2009 |
| CN | 202087569 | 12/2011 |
| CN | 102483240 | 5/2012 |
| DE | 1604293 | 9/1970 |
| DE | 3412204 | 10/1985 |
| DE | 4413600 | 11/1995 |
| DE | 10020736 | 10/2001 |
| DE | 20221100 | 1/2005 |
| DE | 102005016721 | 10/2006 |
| DE | 102005033224 | 7/2007 |
| DE | 102006055001 | 5/2008 |
| DE | 102009030220 | 12/2010 |
| EP | 0511576 | 11/1992 |
| EP | 0536871 | 4/1993 |
| EP | 1227283 | 7/2002 |
| EP | 1967796 | 9/2008 |
| EP | 2368646 | 9/2011 |
| EP | 2422865 | 2/2012 |
| FR | 2613551 | 10/1988 |
| FR | 2911520 | 7/2008 |
| GB | 546878 | 8/1942 |
| GB | 1069868 A | 5/1967 |
| GB | 2030825 | 5/1980 |
| GB | 2032825 A | 5/1980 |
| JP | S54147647 | 11/1979 |
| JP | H01179841 | 7/1989 |
| JP | 04063183 A * | 2/1992 |
| JP | H06292970 | 10/1994 |
| JP | H10288371 | 10/1998 |
| WO | 0048752 A1 | 8/2000 |
| WO | 0184054 | 11/2001 |
| WO | 2004088812 | 10/2004 |
| WO | 2005022046 | 3/2005 |
| WO | 2005045323 | 5/2005 |
| WO | 2005106337 | 11/2005 |
| WO | 2008032571 | 3/2008 |

OTHER PUBLICATIONS

International Search Report from PCT application No. PCT/US2012/064081 dated Feb. 14, 2013, 12 pgs.
International Search Report from PCT application No. PCT/US2013/031237 dated Jul. 23, 2013, 11 pgs.
International Search Report from PCT application No. PCT/US2013/031261 dated Jul. 25, 2013, 13 pgs.
International Search Report from PCT application No. PCT/US2013/030694 dated Aug. 20, 2013, 15 pgs.
International Search Report from PCT application No. PCT/US2013/031246 dated Aug. 9, 2013, 13 pgs.
International Search Report from PCT application No. PCT/US2013/031251 dated Aug. 6, 2013, 15 pgs.
International Search Report from PCT application No. PCT/US2013/030697 dated Jul. 30, 2013, 13 pgs.

(56) References Cited

OTHER PUBLICATIONS

International Search Report from PCT application No. PCT/US2014/011860, dated Apr. 24, 2015, 10 pgs.
International Search Report from PCT application No. PCT/US2014/036956, dated Aug. 29, 2014, 14 pgs.
International Search Report from PCT application No. PCT/US2014/044119, dated Sep. 10, 2014, 10 pgs.

\* cited by examiner

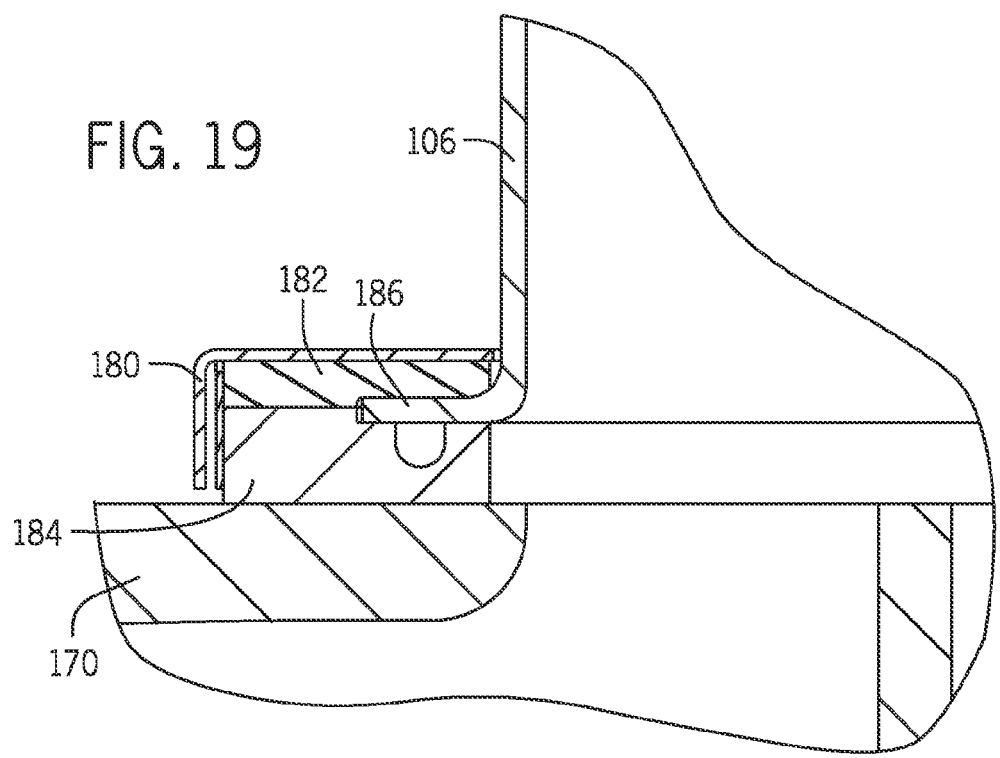
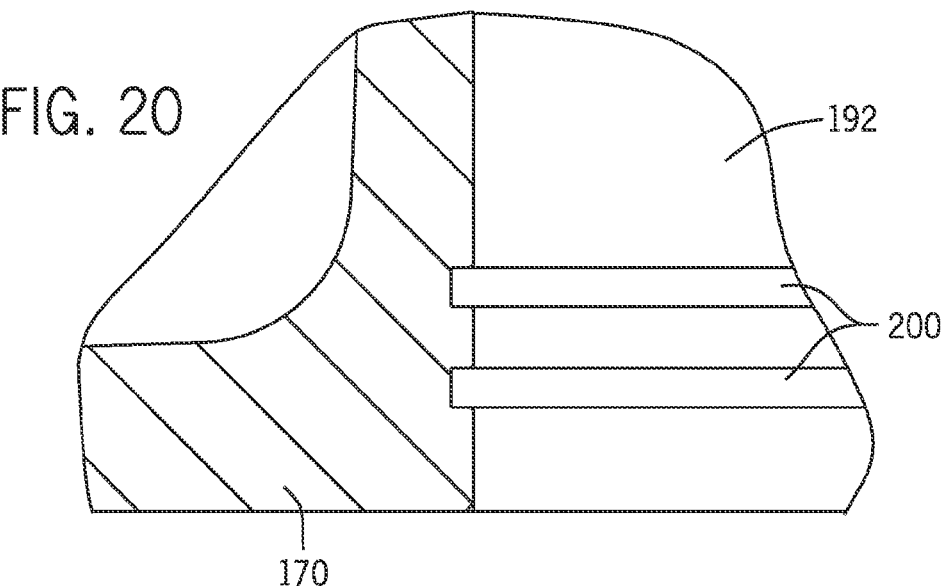

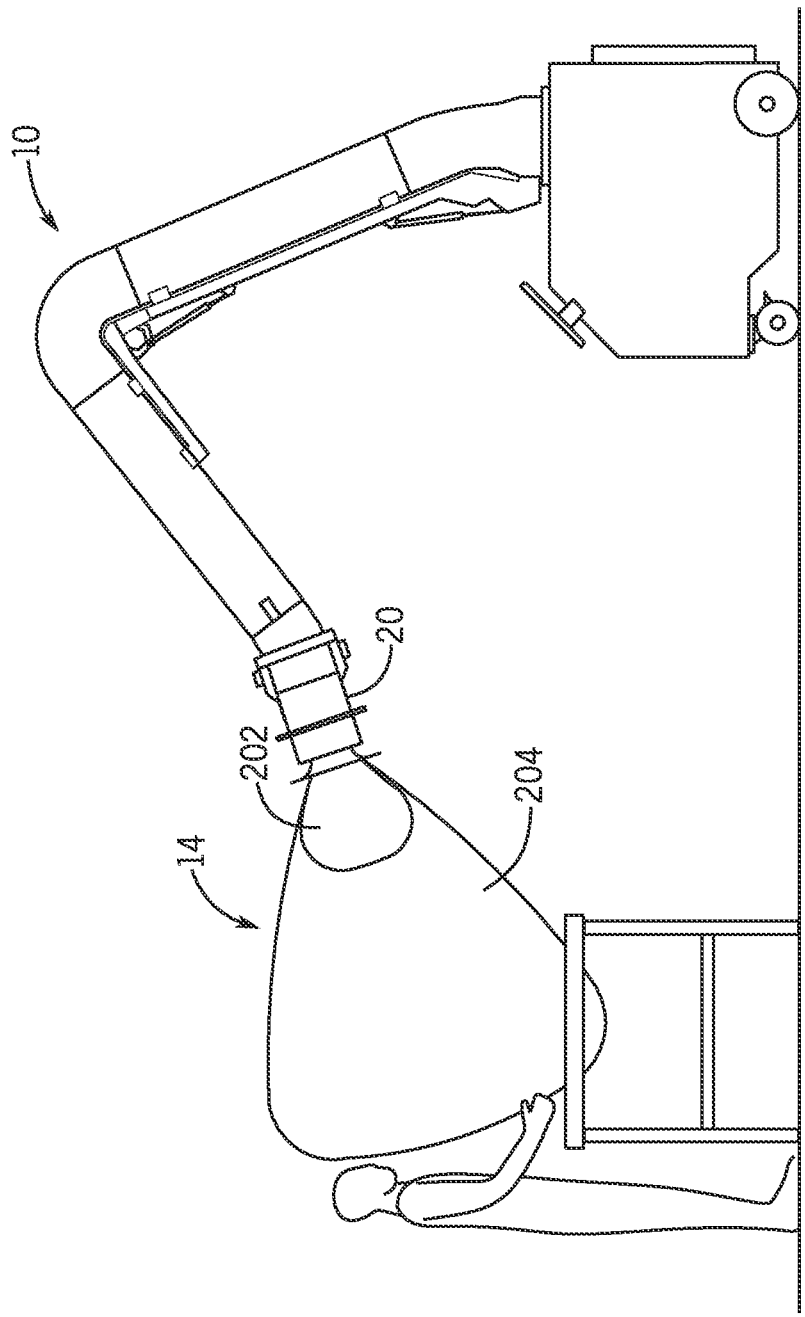

OPTIMIZED AIRBORNE COMPONENT EXTRACTOR

CROSS REFERENCE TO RELATED APPLICATIONS

This application is a Nonprovisional patent application of U.S. Provisional Application No. 61/737,653, entitled "Airborne Component Extractor", filed Dec. 14, 2012; and Provisional Application No. 61/611,885, entitled "Fume Extractor", filed Mar. 16, 2012, which are herein incorporated by reference.

BACKGROUND

The present disclosure relates generally to systems for extracting airborne components from air streams, such as in welding, cutting, metal working, wood working, and other applications.

A wide range of industrial, commercial, hobby and other applications result in airborne components that can be removed with proper extraction and filtering. Metal working operations, for example, range from cutting, welding, soldering, assembly, and other processes that may generate smoke and fumes. In smaller shops it may be convenient simply to open ambient air passages or to use suction or discharge air from fans to maintain air spaces relatively clear. In other applications, cart-type fume extractions are used. In industrial settings, more complex fixed systems may be employed for extracting fumes from specific works cells, metal working locations, and so forth. In other settings, such as machine shops, woodworking shops, worksites where cutting, sanding and other operations are performed, dust, fumes, particulate and other types of airborne components may be generated that it may be desirable to collect and extract from work areas and controlled spaces.

A number of systems have been developed for fume extraction, and a certain number of these are currently in use. In general, these use suction air to draw fumes and smoke from the immediate vicinity of the metal working operation, and to filter the fumes and smoke before returning the air to the room or blowing the air to an outside space. Further improvements are needed, however, in fume extraction systems. For example, it would be useful to increase the effective ability of the systems to draw the fumes and smoke from the metal working workspace. Moreover, it would be useful to increase the distance and expand the volume over which the fume extractor can effectively remove fumes and smoke.

BRIEF DESCRIPTION

The present disclosure provides improvements to extractors designed to respond to such needs. The techniques are based upon the use of a positive airflow in conjunction with a suction airflow that draws airborne components out of the workspace for filtration. The innovations set forth in the disclosure have a number of different facets, and may be used in conjunction with one another to obtain particular synergies and advantages, or separately in some cases.

DRAWINGS

These and other features, aspects, and advantages of the present disclosure will become better understood when the following detailed description is read with reference to the accompanying drawings in which like characters represent like parts throughout the drawings, wherein:

FIGS. 16-20 are illustrations of parts of an exemplary manifold and support assembly for an arm of a cart of the type shown in FIGS. 14 and 15;

FIG. 21 is a diagram illustrating generally a comparison of component collection regions with and without the innovations summarized in the present disclosure.

DETAILED DESCRIPTION

Figure 1:
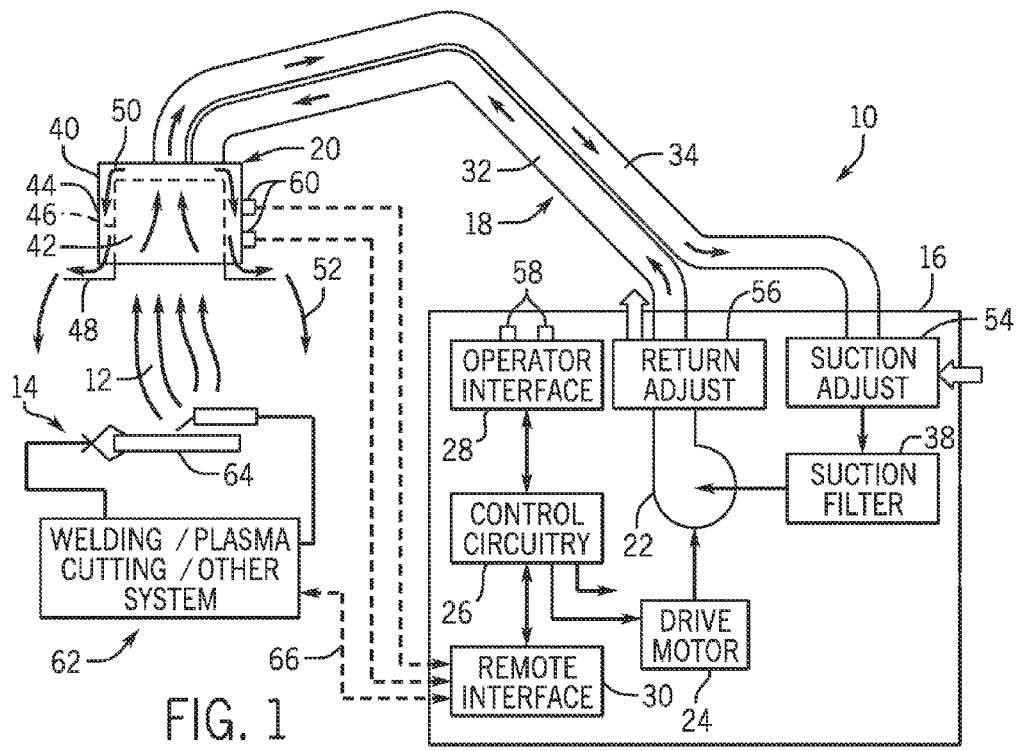
FIG. 1 is a diagrammatical representation of a fume extractor in accordance with aspects of the present techniques.

Turning now to the drawings, and referring first to FIG. 1, an extraction system 10 is illustrated for extracting airborne components, such as smoke, fumes, particulate matter, and more generally, workspace air as indicated by reference numeral 12 from a work area 14. In the illustrated embodiment the extraction system 10 comprises a base unit 16 coupled to conduits 18 that channel air to and from a hood 20. The hood is designed to be placed at or near (typically somewhat above) the area 14 and, when the base unit is activated, serves to create region of air around the area and to extract the workspace air, directing extracted air to the base unit for processing.

It should be noted that while in certain embodiments described in the present disclosure a stand-alone base unit 16, and in one presently contemplated embodiment a cart-type unit is described, the present techniques is not limited to any particular physical configuration. More generally, innovations provided by and described in the present disclosure may be implemented into fixed or semi-fixed installations, such as those used in industrial, commercial, hobby, and other settings. That is, certain of the components of the base unit described herein may serve multiple workspaces, work cells, weld cells, work locations and areas, and so forth, by common conduits that direct positive-pressure air to and channel air and airborne components from multiple workspaces. Operator controls, where provided as described below, may be positioned remotely from these workspaces, or within the workspaces for control of flow to and from the particular workspace.

It should be noted that the "airborne components" discussed in the present disclosure may include any substance that is borne by, suspended in or otherwise carried by the air, or more generally the fluid present in the area considered. Depending upon the application, the airborne components may be in an aerosol form, such as solid, liquid or gaseous phase particles that are suspended in air. Such airborne components may form smoke, fumes (including chemical fumes), of clouds present or given off by an operation ongoing in the area, whether or not visible to the human operators. In other applications, the airborne components may be at least temporarily airborne but not suspended in the air, such as in the case of larger particulate, such as droplets, mist (e.g., from oils, coolants, and so forth), dust (e.g., from drywall, grain, minerals, cements, or other dust sources), chips, debris, and so forth. The present techniques are directed to collecting and extracting any such airborne components in the manners described. Similarly, reference is made in this disclosure to "air" or "airborne", although the fluid in which the airborne components are found and that is circulated by the system may be, more generally, a gaseous substance that need not contain the same constituents, or in the same ratios as found in atmospheric air. Such gasses are intended nevertheless be included in the term "air" or "airborne". Moreover, it is presently contemplated that the same principles of fluid dynamics and borne component removal may be applied to other "fluids" than air or gasses (including liquids), and to that extent the teachings of the present disclosure are intended to extend to those applications.

Returning to FIG. 1, as illustrated the base unit 16 comprises a blower 22, such as a squirrel-cage blower, driven by a drive motor 24. The drive motor is controlled by control circuitry 26 which may provide drive signals to the motor for fixed-speed or variable-speed operation. The base unit 16 may be designed to draw power from any source, such as the power grid, battery sources, engine-generator sets, and so forth. The control circuitry 26 typically includes processing circuitry and memory for carrying out drive operations as desired by the operator or in response to system inputs as described below. Accordingly, the control circuitry 26 may communicate with an operator interface 28 for receiving operator settings, speed settings, on-off commands, and so forth. Similarly, the control circuitry 26 may communicate with a remote interface 30 designed to receive signals from remote inputs, remote systems, and so forth. The remote interface may also provide data to such remote systems such as for monitoring and/or controlling operation of the extraction system.

In the illustrated embodiments conduits 18 extending between the base unit 16 and the hood 20 comprise a positive pressure air conduit 32 and a return air conduit 34. In general, the positive pressure air conduit 32 provides air to the hood, while the return air conduit 34 is under a negative or slight suction pressure to draw air containing the airborne components from the workspace. The air returning from the hood in conduit 34 may be directed through a suction filter 38 before being re-introduced into the blower 22. As described below, the system may also include components designed to allow for adjustment of the individual or relative flow rates of one or both of the positive and negative pressure air streams.

In the embodiment illustrated in FIG. 1, the hood 20 comprises an outer shroud 40 which is essentially a rounded bell in a present embodiment, as well as an inner shroud 42 positioned within the outer shroud 40. The sidewall 44 of the outer shroud is spaced from the inner shroud sidewall 46, and the inner shroud sidewall terminates in a lower peripheral flange 48. An annular space 50 is thus defined between the sidewalls 44 and 46 of the outer and inner shrouds. Positive pressure air flows through this annular space and is distributed within it, ultimately flowing downwardly as indicated by the arrows in FIG. 1 and impacting the flange 48. The flange forces a generally radially outward flow of air to form the air region 52. In a presently contemplated embodiment, the flange 48 is substantially perpendicular to the center line of the inner and outer shrouds, which are generally aligned coaxially with one another. It has been found that the substantially perpendicular, radial outflow of air creates a very effective air region, allowing the hood to be spaced a considerable distance from the workspace or workpiece positions while still providing very effective evacuation of airborne components.

As noted above, the present techniques may allow for adjustment of the positive pressure air flow and/or the return air flow to optimize operation of the system. Several different techniques are presently contemplated for such adjustment. For example, in the embodiment illustrated in FIG. 1, a suction air adjustment 54 may be provided before the suction filter 38. This adjustment may comprise, for example, a bypass valve, a louver, or other mechanical device which may be adjusted to limit the flow of air from the suction filter and, consequently, the intake of air into the blower 22 from the ambient surroundings. Similarly, a return air adjustment 56 may be provided that may be similarly configured to allow for adjustment for the flow rate of returning air. In some cases, this adjustment may allow some air to exit to the environment, as illustrated in FIG. 1. Such adjustment may advantageously allow for relative mass or volumetric flow rates of the positive pressure and return airstreams to enhance creation of the air region and extraction of workspace air. In an alternative configuration, manual adjustment of one or both of the suction and return air streams may be replaced by electronic control via inputs, designated by reference numeral 58. These may be provided on the base unit, such as through adjustment dials, membrane switches, operator touch controls, and so forth. Still further, manual and/or electronic adjustment of one or both airstreams may be provided at the hood. In the embodiment illustrated in FIG. 1, for example, electronic inputs 60 are provided for both adjustments. These are communicated to the remote interface 30 of the base unit which, in turn, communicates them to the control circuitry 26. The control circuitry may be coupled to any suitable device, such as the suction and return adjustments 54 and 56 to regulate their operation (e.g., via small adjustment motors and actuator assemblies). It should also be noted that adjustments to flow rates for the positive and negative pressure airstreams may be made by altering the speed of one or more motors and/or blowers, fans or compressors.

It should also be noted that a system may be adapted to exchange data with other system components, such as a welding/plasma cutting or other system 62. In the illustrated embodiment, the system 62 may comprise, for example, welding or plasma cutting power supplies, wire feeders, shielding gas supplies, and so forth. In other metal working settings, the system may include various other manual and machine tools. In still other settings, the system may include various robots, production lines, power tools (e.g., saws, workstations, etc.). These will typically be coupled to the operation to accomplish the desired task on a workpiece 64. Certain of these systems may be capable of providing control signals to the extraction system to allow for turning the extraction system on and off, regulating speeds and air flows, and so forth. Such communications may be provided via suitable cabling 66 or by other means by wireless communications. An exemplary system designed to control operation of a fume extractor is described, for example, in U.S. patent application Ser. No. 13/356,160, filed on Jan. 23, 2012, by Mehn et al., and entitled "Fume Extractor for Welding Applications", which is hereby incorporated by reference.

Figures 1A, 1B:
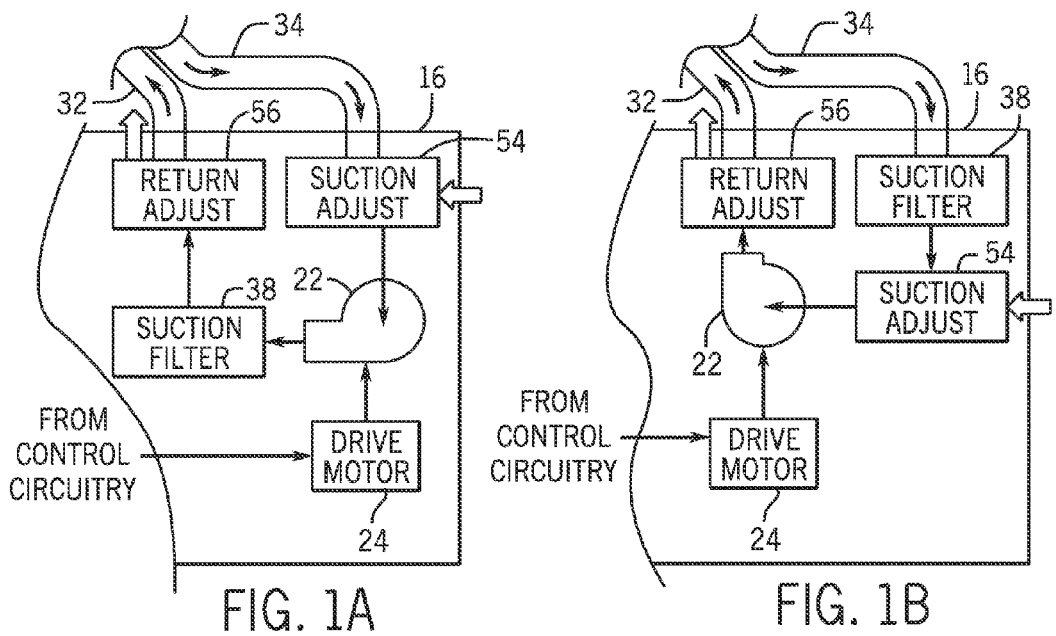
FIGS. 1A and 1B illustrate certain presently contemplated variations on the interconnection of components used to provide positive pressure air and draw fumes and smoke from an application.

FIGS. 1A and 1B illustrate certain alternative configurations and interconnections of the components of the base unit 16. In particular, as shown in FIG. 1A, the filter 38 may be placed downstream of the blower 22, and the suction adjustment 54 may direct air into the blower directly. In this case, the filter 38 may discharge directly into the return adjustment 56. In the alternative of FIG. 1B, the suction filter 38 is placed upstream of the suction adjustment 54, which here again directs air into the blower.

Here again, it should be noted as well that although separate adjustment mechanisms are described in connection with certain embodiments, a single adjustment could be provided that allows for simply adjusting the ratio of the flow rates, such as via a single knob or input at a base unit, at the hood, or at any convenient location.

Moreover, other and additional components and functionalities may be built into the system. For example, it is presently contemplated that at least one of the components described above, or additional components may provide for temperature regulation of the positive pressure air stream. For example, due to the significant assist offered by the positive pressure region for airborne component removal, the operator may desire to discontinue use of other fans, blowers and so forth in the work area. The positive pressure airstream may be cooled by one or more components of the base unit (or centralized system) to provide not only the desired region surrounding the work area for component removal, but also cooling for the operator. Heating in a similar manner may also be provided.

Figure 2A:
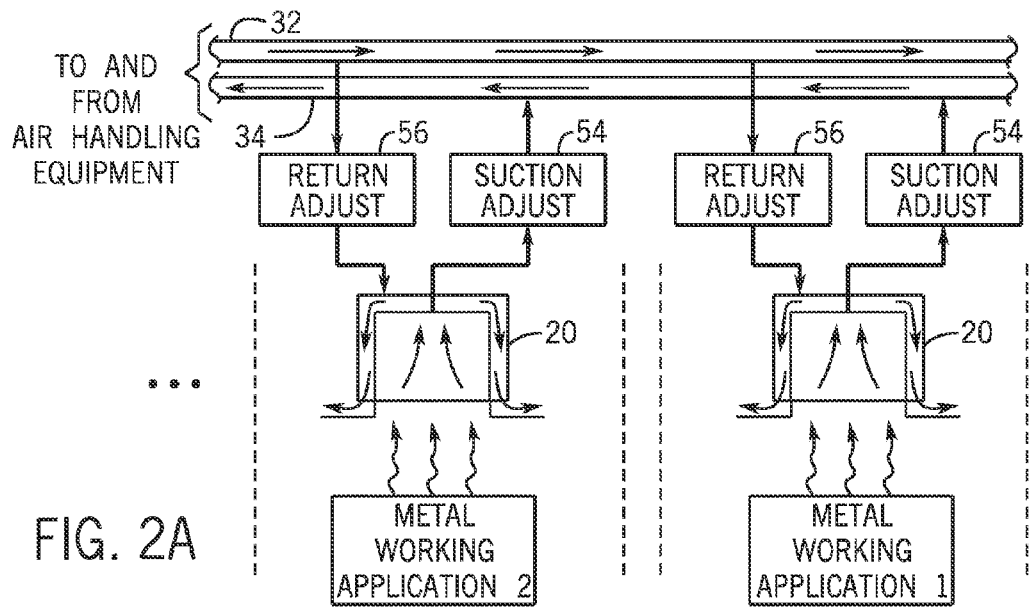
FIGS. 2A and 2B are diagrammatical representations of fixed or semi-fixed installations utilizing the techniques described herein.
Figure 2B:
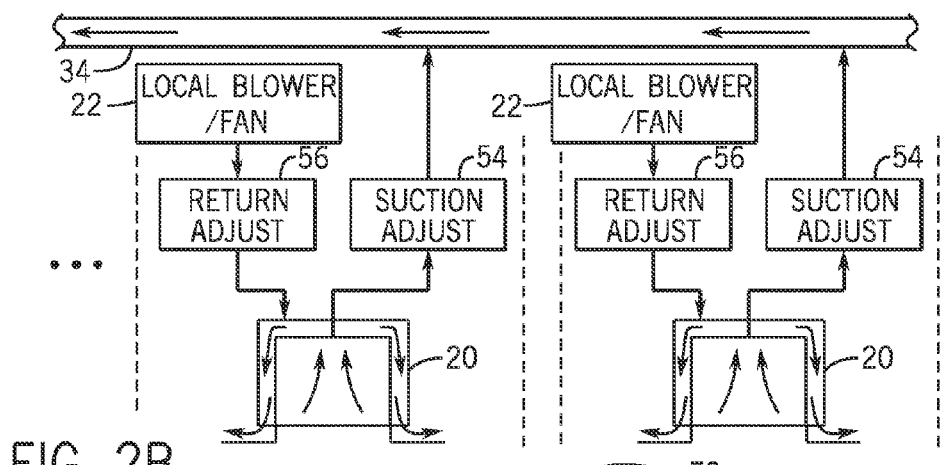
Figure 2:
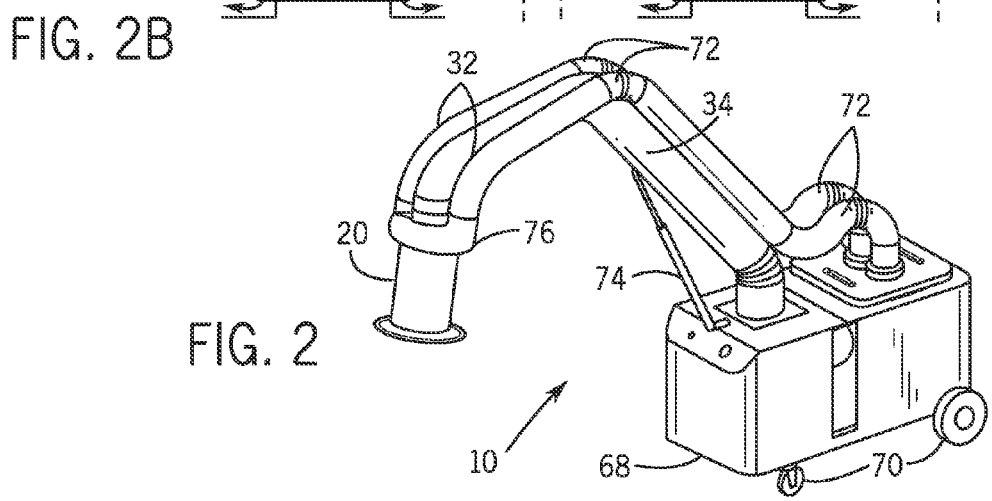
FIG. 2 is a perspective view of an exemplary implementation of the fume extractor in a cart-like apparatus.

FIG. 2 illustrates an exemplary embodiment of the system 10 implemented as a cart 68. The cart is designed to be rolled on wheel or casters 70 to the vicinity of a metal working operation. As described above, conduits 32 and 34 direct positive pressure air to the hood 20 and draw suction air back to the base unit. The base unit components described above are situated in or on the cart 68. The cart is designed to be plugged into a conventional outlet, such as to draw power from the power grid. The embodiment illustrated in FIG. 2 comprises two positive pressure air conduits 32 positioned on either side of a return air conduit 34. All the conduits include flexible joints 72, allowing raising, lowering, lateral and other positioning of the hood at or near, typically above, the work space. Support structures, indicated by reference numeral 74, may assist in supporting the conduits and hood. All of these components may be retracted back towards the cart for ease of storage and transportation. Moreover, in the embodiment illustrated in FIG. 2 and as discussed in greater detail below, this arrangement of conduits may make use of a manifold 76 that aides in distributing positive pressure air flow to the annular space between the inner and outer shrouds of the hood.

As mentioned above, the present techniques may be employed in systems and arrangements other than carts or systems and base units that are local to a work location. FIGS. 2A and 2B illustrate exemplary fixed or semi-fixed systems of the type that may be employed in workshops, factories, assembly and metalworking plants, and so forth. In the embodiment of FIG. 2A, a positive air conduit 32 provides air from a common air handling system, such as one equipped with a blower, filter, and any other components desired to provide air flow to multiple weld cells or other application locations. A negative air conduit 34 similarly draws air from multiple application locations. In this sense, the conduits form headers or manifolds that may be positioned over the work areas or otherwise routed between them. Each work area, then, is provided with a respective hood 20 for extracting fumes and smoke, as well as respective suction and return adjustments 54 and 56. These may operate manually or electrically, as mentioned above in the case of the cart-type embodiment. FIG. 2B shows an alternative arrangement in which a suction conduit is provided, but in which each work area has its own local blower or fan. These may be provided either upstream or downstream of a return adjustment 56, while a suction adjustment 54 is provided for adjustment the volumetric or mass flow rate of air and gas flowing to the common header or manifold defined by conduit 34.

Figure 3:
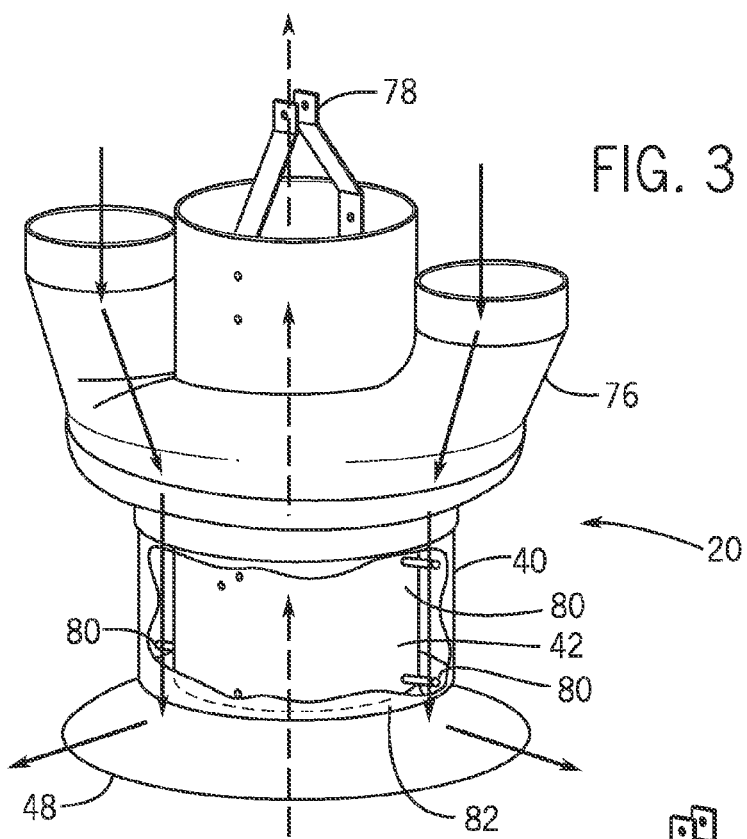
FIG. 3 is a perspective view of an exemplary hood for directing positive pressure air flow to an operation and extracting fumes and smoke through an inner shroud.

FIG. 3 is a more detailed view of an exemplary hood in accordance with certain aspects of the present techniques. As shown in FIG. 3, the hood 20 includes and outer shroud 40 and inner shroud 42 spaced from one another to allow for airflow as described above. Attachment components 78 may be secured to the return air conduit (or one or more positive pressure air conduits) for supporting the hood on the conduits. Moreover, various mechanical structures, such as stand-offs 80 may be provided for defining and maintaining the annular spacing between the outer shroud 40 and inner shroud 42. As will be appreciated by those skilled in art, flange 48 has an upper surface that is spaced from the lower peripheral edge of the outer shroud 40 to define an annular opening or gap 82. Positive pressure air flows down into the manifold 76, is distributed by manifold around the annular spacing between the inner and outer shrouds, flowing downwardly through the annular spacing and outwardly through the opening or gap 82 to provide the desired air region, as indicated by the arrows in FIG. 3. Various forms of manifolds may be provided, and these may accommodate one, two or more positive pressure airstream conduits. For example, two such inlets are provided in the manifold 76 of FIG. 3, and these may direct air or partially or fully around the annulus. In some embodiments, the shroud may be effective to distribute the positive pressure air flow without the need for a manifold. Another embodiments, diverting structures, baffles, and so forth may be provided in a manifold to generally equally distribute the incoming airflow around the hood.

Figure 4:
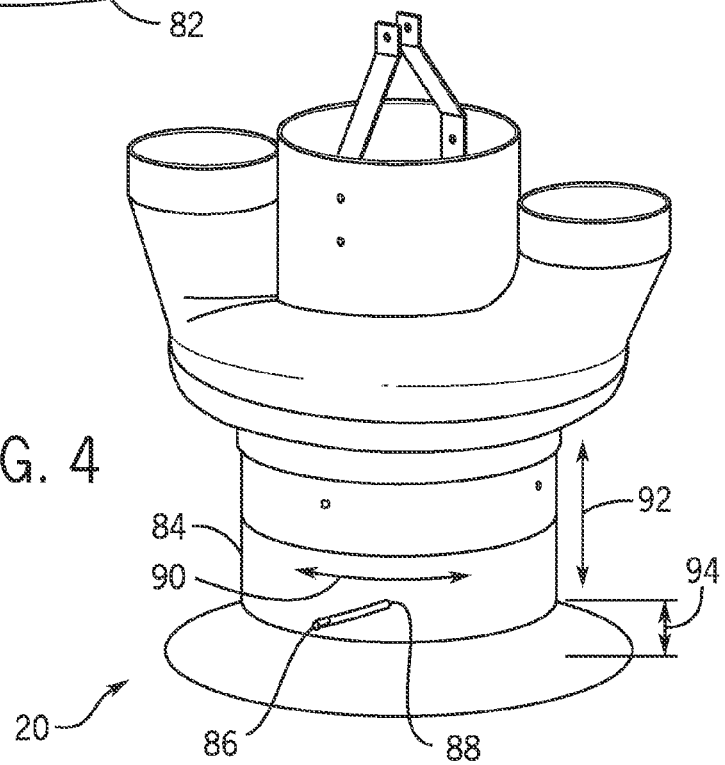
FIG. 4 is a similar hood provided with manual means for adjusting outgoing air.

FIG. 4 illustrates a further embodiment of a hood 20 designed to allow for manual adjustment of positive airflow.

As noted above, electronic control inputs, such as push buttons, dials, and touch controls, may be provided on the hood to channel signals via conductors or wirelessly to the base unit, or more generally, to the location of the flow control devices. However, manual control of one or more airstreams, may be provided, such as illustrated in FIG. 4. In this embodiment, a movable outer shroud section 84 is provided immediately above the lower flange. The movable outer shroud section is mounted on one or more pins 86 extending from either the inner shroud or a fixed outer shroud section as illustrated in FIG. 4. The movable outer shroud section 84 thus comprises a slot 88 that is inclined and receives the pin 86. Where multiple pins are provided, multiple slots 88 may be used for mounting the movable outer shroud section. The movable outer shrouds section 84 may thus be rotated as indicated by reference numeral 90 to cause axial translation of the movable outer shroud section as indicated by reference numeral 92. This translation allows for adjustment of the air gap 94 between the movable outer shroud section and the flange 48, providing control of the mass or volumetric airflow of air region-producing positive pressure airstream. Other structures may, of course, be devised to provide for adjustment of this gap so as to permit regulation of air flow.

Figure 5:
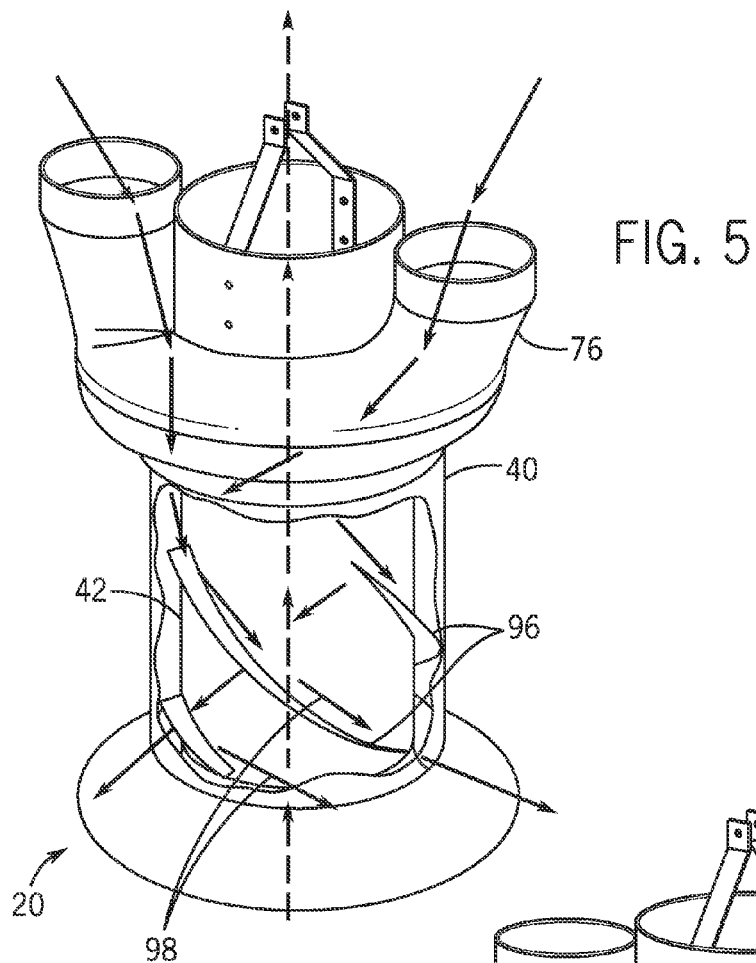
FIG. 5 is a similar representation of a further implementation of a hood designed to create a swirling air flow.

FIG. 5 illustrates a further embodiment of the hood designed to create a swirling air flow. In this case, the components of the hood may be substantially similar to those described above, but in the annular space between the outer shroud 40 and inner shroud 42 multiple helical fins 96 are provided. The angle, width, extent, and so forth of these fins, in addition to the number of fins, may be selected to impart a swirling pattern to the outgoing air that creates the air region. The incline of the flange 48 may also be adjusted to enhance the creation of the air region. Air flowing down through the annular space, then, has a downward and outward directional component as well as a circumferential component, as indicated by arrows 98 in FIG. 5.

Figure 6:
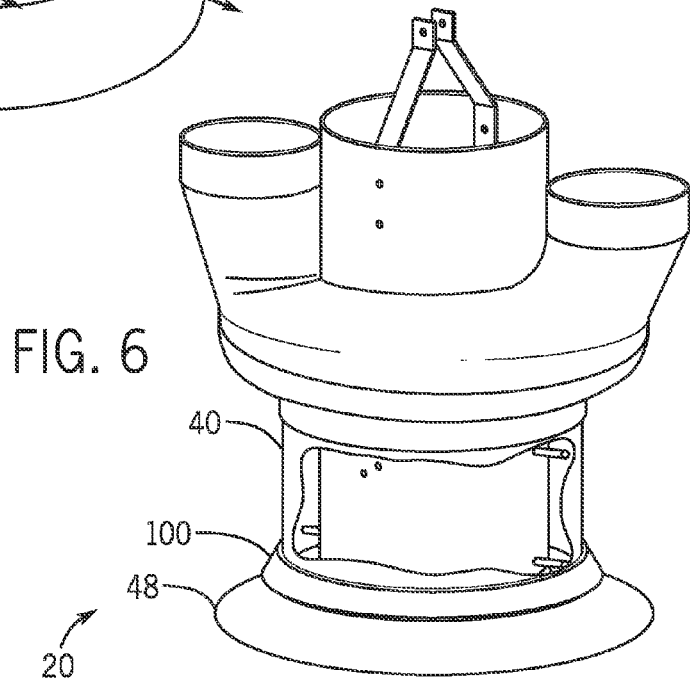
FIG. 6 is a further implementation of a hood employing a radial collar to assist in directing positive pressure air flow outwardly from the hood.

Still further, FIG. 6 illustrates an alternative configuration of the hood in which a radial collar 100 is positioned between a lower peripheral edge of the outer shroud 40 and the flange 48. Such a collar may be used to aide in directing the exiting air as it impacts and flows over the flange 48.

It should be noted that the hood provided in all of these implementations may include a single flange for directing the positive pressure air radially outwardly, thereby significantly facilitating manufacture of the hoods and reducing their weight. In certain presently contemplated embodiments, for example, the outer and inner components of the hood are molded or otherwise formed separately, and then assembled by simply inserting the inner component into the outer and securing it in place, with the single flange spaced from the lower periphery of the outer component.

It should also be noted that the adjustability of the volumetric or mass flow rates of positive and negative pressure air streams provides a significant improvement over other fume and smoke or more generally, airborne component extractors. It has been found that the ability to strike a balance between the flow of positive pressure air into the region surrounding the work area and the flow of negative pressure air drawn from the work area results in an extremely flexible system that can be adapted to the needs of the user, while providing enhanced component removal at greater distances from the work than previous systems.

There are several ways in which the best ratio or balance between positive and negative pressure air flows may be qualified, with this ratio being adjustable by adjustment of the air flow parameters. For example, the ratio provided by:

$$R = \frac{\frac{\text{positive pressure airstream flow rate } X}{\text{positive pressure airstream velocity}}}{\frac{\text{negative pressure airstream flow rate } X}{\text{negative pressure airstream velocity}}}$$

has been found to provide a good indication of the effectiveness of fume evacuation. The positive pressure airstream velocity may be measured, for example, at the region between the lower periphery of the outer shroud and the peripheral flange of the inner shroud. The negative pressure airstream velocity may be measured, for example, at the inlet (lower opening) of the inner shroud. Such locations offer a convenient and standard place to compare air movement parameters. In presently contemplated embodiments, the ratio R is advantageously between about 0.25 and 100, and it is believed that the ratio is particularly advantageously between about 0.6 and 10.

It should also be noted that particularly good performance has been found to result from particular ratios of mass or volumetric flow rates of the positive and negative pressure airstreams. For example, in currently contemplated embodiments, these airstreams may have mass or volumetric flow ratios (positive-to-negative airstream ratios) of between approximately 1:1 and 0.5:1, with a ratio of approximately 0.8:1 being used in a present configuration. As disclosed above, these flow rates may be obtained by system design (e.g., the sized of the conduits), but also by intaking additional air to the blower from the environment, or expelling air from the blower, each of which may, where desired, be adjustable.

Performance may be improved as compared to conventional evacuation systems, and optimized in the current techniques by appropriate selection and sizing of the system components, particularly of the conduits used to convey the airstreams to and from the work area. For example, in a currently contemplated design based on co-axial conduits, described below, an inner conduit has a nominal diameter of 7 inches, or a cross-sectional area of approximately 38 in$^2$, while the outer conduit has a nominal diameter of 10 inches, or a cross-sectional area of approximately 79 in$^2$, such that the annular area for the outgoing airstream has a cross-sectional area of approximately 41 in$^2$. It is believed that a ratio of the outgoing flow area to the return flow area of between approximately 4:1 and 0.7:1 may be particularly optimal for obtaining the best airborne component removal. In a present configuration, the ratio is between approximately 1:1 and 1.5:1. As will be appreciated by those skilled in the art, the flow areas selected may contribute significantly to the total static head required of the blower or blowers, and this may be one of the design factors leading to the ratios specified.

Figure 7:
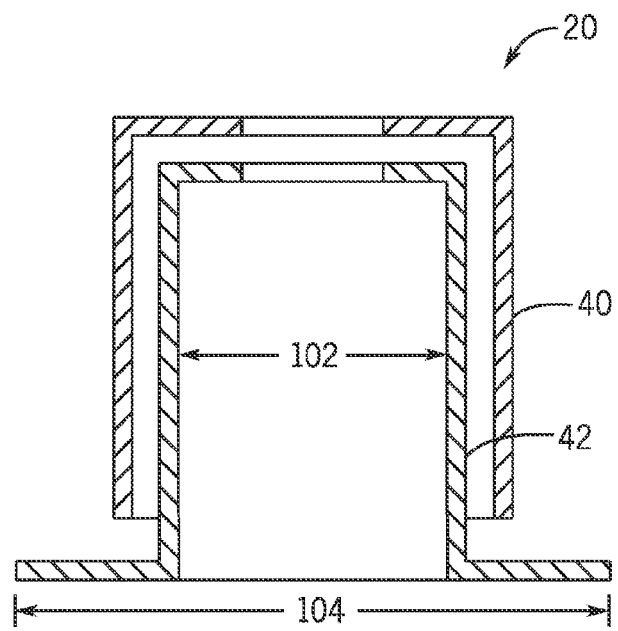
FIG. 7 is a diagrammatical section of an exemplary hood illustrating certain dimensions that may be advantageous to provide a degree of adjustability in the provision of air to and withdrawal of air from the hood.

Further, it has been found that for a single-flange hood of the type discussed, certain dimensional relationships may provide for optimal component removal. FIG. 7 illustrates such a hood, diagrammatically, in which an effective inner diameter of the inner shroud 42 bears a particular relation to the outer effective diameter of the flange of the inner hood. In particular, a ratio of the effective inner diameter 102 of the inner shroud to the effective diameter 104 of the flange is advantageously between about 0.25 and 0.75, and is believed to be particularly advantageously about 0.5. By way of example, in a present embodiment, the inner diameter 102 is about 8 inches, while the outer diameter 104 is about 16 inches. It should be noted that the term "effective diameter" is used here to accommodate cases in which the shape of the inner shroud is not a right cylinder, or where either this shape or the shroud shape is other than circular in section.

Figure 8:
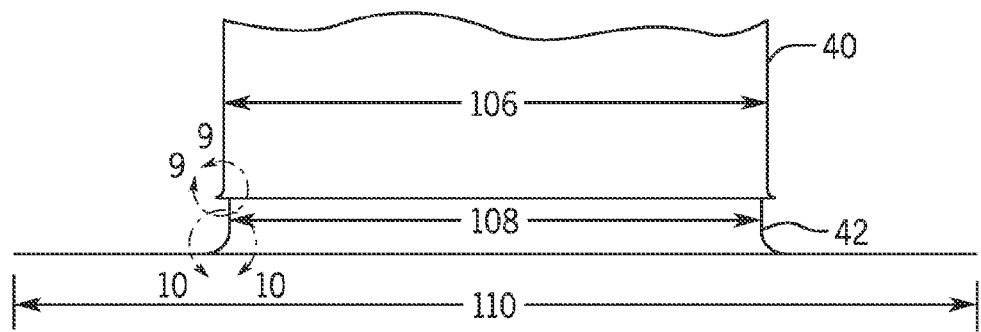
FIG. 8 is an elevational view of a portion of a hood in accordance with certain embodiments of the present techniques.
Figure 9:
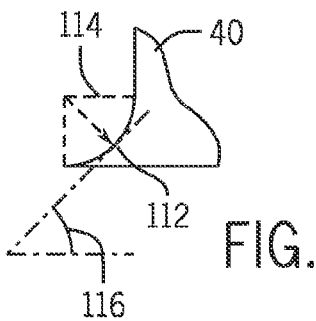
FIGS. 9 and 10 are detail views of parts of the hood of FIG. 8.
Figure 10:
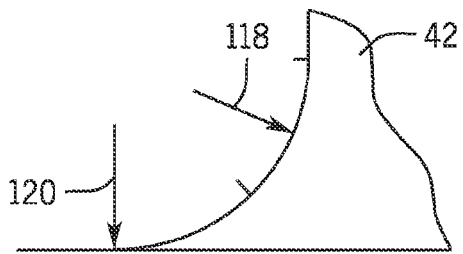

FIG. 8 illustrates a particular implementation for the hood of the type shown in FIG. 7. The hood illustrated in FIG. 8 has an outer shroud 40 and inner shroud 42 as described above. In this particular embodiment, the outer shroud 40 has a nominal diameter 106 of 10 inches, and the inner shroud 148 has a nominal diameter of 7 inches. The flange extending from the inner shroud has a nominal diameter of 110 of 18 inches. The outer shroud 140, moreover, has a radiused lip as best illustrated in FIG. 9. This lip, indicated generally by reference numeral 112, aids in smooth redirection of the airstream from the annular area between the outer shroud and inner shroud. In the embodiment illustrated in FIG. 9, the lip 112 has a radius of 0.25 inches as indicated by reference numeral 114, and extends to an angle 116 of approximately 45 degrees. It should be noted that in some embodiments, the lip on the outer shroud may be extended to form a flange much like that on the inner shroud, forming a sort of "double flange" structure. As illustrated in FIG. 10, the outer flange of the inner shroud has a similar radius to promote smooth redirecting of the air flow both out of the angular area between the shrouds and back into the inner shroud. In the illustrated embodiment, two radiuses are present at this transition point, a first radius 118 of approximately 2 inches, followed by a larger radius of approximately 7 inches transitioning to a generally flat section which is approximately perpendicular with the centerline of the shroud.

Figure 11:
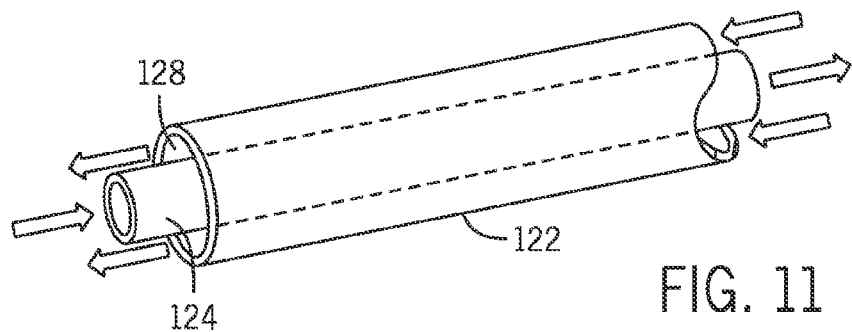
FIG. 11 is a broken perspective view of a coaxial conduit arrangement for providing positive pressure air flow and suction flow.

As discussed above, various configurations of conduits, numbers of conduits and so forth may be envisaged. FIG. 11 represents, for example, conduits arrangement in a generally coaxial or tube-in-tube arrangement. Such arrangement may facilitate mounting, routing, supporting and handling of the hood with respect to the base unit. In the embodiment shown in FIG. 11, for example, an outer conduit 122 has positioned generally coaxially within it an inner conduit 124 to produce an annular flow space 124. In this embodiment, positive pressure air flows through the annular space, with return air flowing through the inner conduit. It may be desirable to place standoffs or other fixed structures between these conduits to maintain them spaced between one another, or in some arrangements these may be dispensed with and the conduits allowed to be more or less freely disposed one within the other.

Figure 12:
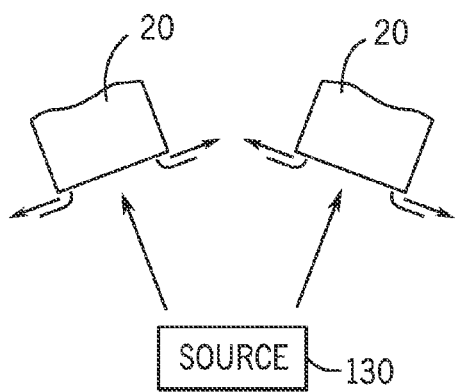
FIGS. 12 and 13 are diagrammatical views of certain alternative embodiments that include multiple hoods and/or nozzles.
Figure 13:
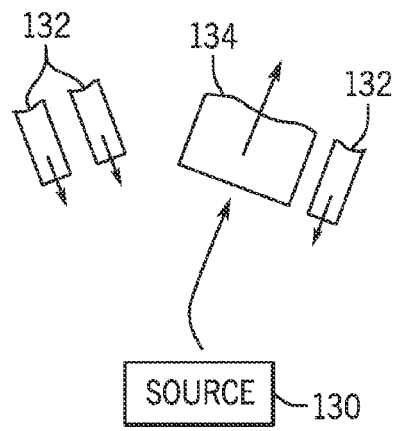

It should be noted that, while reference has been made to a single nozzle having inner and outer shrouds, certain adaptations may be made to the system without deviating from the techniques discussed in the present disclosure. For example, FIGS. 12 and 13 illustrate variations in which multiple shrouds or nozzles may be used for positive pressure air flow and/or negative pressure air flow. In the illustration of FIG. 12, two hoods 20 are illustrated adjacent to a source 30 from which fumes, gasses, particulate matter and so forth are to be drawn. These may be coupled to the same or to a different system, which again may be cart-like extractor or a fixed installation. As shown in FIG. 13, in some embodiments the positive flow and extraction flow may be separated. In this embodiment, multiple blower nozzles 132 are shown separated from an extraction conduit 134. In such embodiments, nozzles 132 may be positioned in any desired manner around a source 130. In certain embodiments, for example, there may be positioned radially around the source, with one or more extraction conduits being positioned adjacent to the outflow nozzles, such as in a central position.

Figure 14:
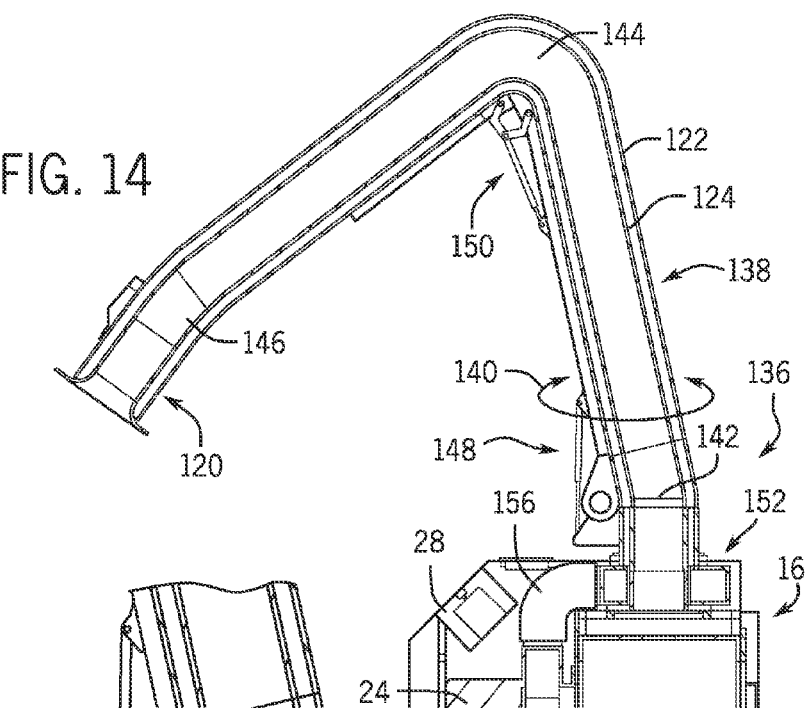
FIGS. 14 and 15 are diagrammatical views of a currently contemplated extraction cart in accordance with aspects of the present techniques.
Figure 15:
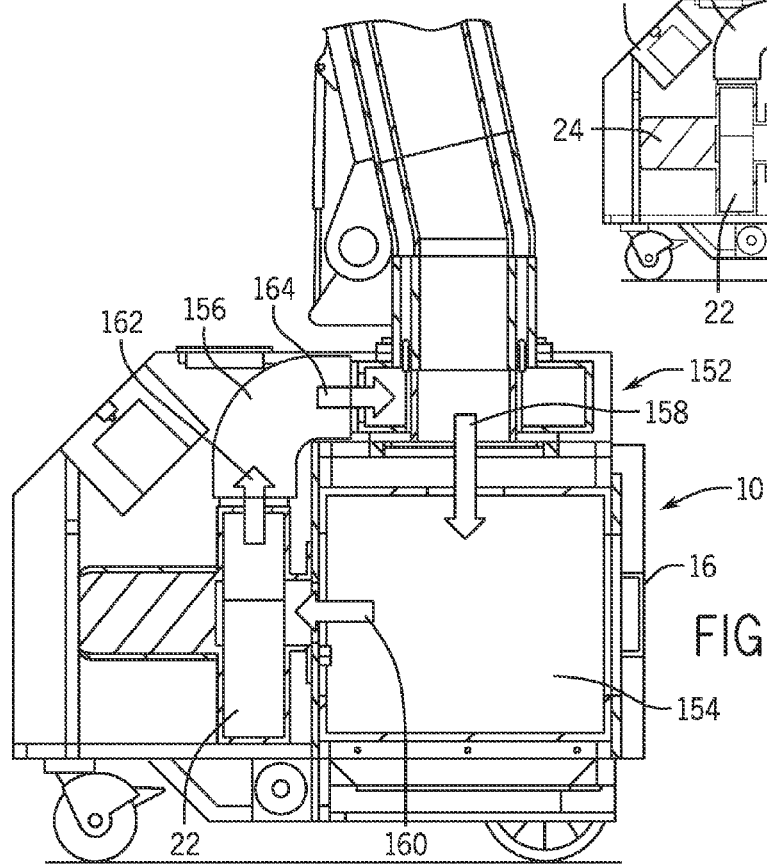

FIGS. 14 and 15 illustrate they currently contemplated arrangement for a system as described above in a cart-like product. The cart, designated generally by reference numeral 136, includes a base unit 16 generally of the type described above. In this particular embodiment, an arm 138 extends from the base unit and includes concentrically positioned conduits as described above. The arm provides both a positive pressure or outgoing flow and a return flow that may contain airborne components to be extracted from the work area. In this embodiment the arm 138 is adapted for rotation as indicated by arrow 140. The arm may rotate more or less than 360°, and in a present embodiment rotation is limited to somewhat less than the 360°, although full multi-rotation capabilities may be designed into the joint between the arm and the base unit.

In the embodiment of FIG. 14, the arm 38 has a lower joint 142 where it joins the base unit, a middle joint 144 that joins two generally linear sections of conduit and a hood joint 146 about which the hood 120 may be pivoted at least within a limited angular range. A support structure 148 is provided adjacent to the lower joint 142 to aid in supporting the arm as it is extended toward and retracted from a work area. A similar support 150 is provided adjacent to joint 144. In presently contemplated embodiments, the joints include smooth inner walls that can be deformed so as to permit extension, retraction and, more generally, positioning of the arm with respect to the base unit, while adding little or no head loss as compared to a linear section of conduit. A manifold and support assembly 152 is provided at a top section of the cart and aids in transitioning return flow and outgoing flow to and from the cart as described more fully below. The manifold and support assembly 152 also aids in mechanically supporting the arm on the cart as it is extended, retracted, and rotated.

Within the cart, return flow enters a filter box 154 where it is filtered to remove fine and larger particulate matter and other components borne by the airstream. The assembly may be designed for pressure cleaning, in a process that may direct pressurized air against one or more filter elements to promote the release of the captured particulate. From the filter box 154, air is drawn into the blower 22 which is driven by a motor 24 as described above. The blower discharges to a turn or elbow 156 that directs outgoing flow to the manifold and support assembly 152. It should be noted that in some embodiments, one or more motors and/or blowers may be employed. For example, one motor and blower set may be used for the outgoing or positive air stream, while another motor and blower set may be used for the return or negative air stream.

It is believed that greatly enhanced performance is obtained by the design of the cart in which as few as possible turns are provided in the incoming and outgoing flows. That is, as best illustrated in FIG. 15, the incoming flow is virtually linear from the arm to the filter box 154 as illustrated by arrow 158. Air within the filter box is nearly static, depending upon the size of the filter box and the flow rate of the air. Thus, a bend may be considered to occur in the filter box, although from a practical standpoint in a current embodiment little or no head loss occurs at this point. Flow from the filter box, indicated by arrow 160, enters the fan or blower 22, and exits as indicated at reference numeral 162. From this point a single redirection is made in the turn or elbow 156 (which in the presently contemplated embodiment is a smooth, radiused elbow that confines directs the flow), and the outgoing flow enters the manifold and support assembly 152 as indicated by arrow 64. As described more fully below, the manifold and support assembly efficiently redirects the air into the annular area between the coaxial conduits, while permitting rotation of the arm.

As described herein, a "bend" within the base unit corresponds to a change in direction of between 25° and 180°, and in a particular embodiment a change in direction of approximately 90°. With this definition in mind, the only bend that occurs within the base unit is essentially at turn or elbow 156. That is, within the filter box 154, although the air is redirected to the blower inlet, air within the filter box may be considered essentially static. Air within the manifold and support assembly 152 is carefully directed by a volute structure as described below. In this sense, the base unit may be considered below. In this sense, the base unit may be considered to have a single bend. Depending upon the design of the components, the unit may be considered to have two or three bends (or more) within the filter box 154, within the turn 156, which again in the presently contemplated embodiment is a smooth elbow that efficiently directs air, and within the manifold or support assembly 152. The redirection performed by blower is considered differently insomuch as the blower is the source of the static and dynamic head imparted on the airstream. Again, it is believed that by minimizing the bends or necessary redirection of the flow within the cart, greatly enhanced performances obtained with minimal head loss. The cart may best be designed with a small and highly efficient drive motor on the blower. By way of example, current designs provide airflow with a total head across the blower on the order of 14 in $H_2O$. Depending upon the condition of the air filter, the total static head of the system may vary between 10 in $H_2O$ and 18 in $H_2O$. With such reductions in power requirements, current designs with an airstream volumetric flow of 900 CFM may utilize a motor having a power rating of 5 Hp. However, a presently contemplated range of between 3 and 7.5 Hp motors may provide excellent operation, particularly in an industrial context. Other power ratings and sized may, of course, be used. As noted above, in some embodiments, more than one motor and/or blower, fan or compressor may be used. Similarly the motor or motors may be fixed or variable speed.

In currently contemplated embodiments, the system may be designed such that the electrical requirements of the motor or motors, and other components may be supplied by a 460 V, 3 phase power source. In other embodiments, the system may be designed to receive 230 V, 1 phase power. In still other embodiments, the system may designed for 115 V, 1 phase power. It is also contemplated, that, in addition to "professional" and "commercial" implementations, the techniques may be employed for hobbyist and other applications. Indeed, it is contemplated that original equipment or even retrofits may be made to equipment such as shop vacuum systems, existing evacuation installations, and so forth. It is also contemplated that structures and teachings based on those set forth in the present disclosure may be utilized in specific settings to provide airborne component collection to enhanced effect. For example, smaller systems may be based on a 1 Hp or smaller motors, with short positive and negative pressure conduits, such as for desk or table-top use. Such systems may be particularly useful at workbenches, for smaller applications, for commercial and hobbyists, and so forth.

Moreover, as will be appreciated by those skilled in the art, the head provided by the system will typically be a function of such factors as the flow areas involved (and their relative sizes), the number of bends in the system (and the nature of these—smooth and controlled versus more turbulent or tight), the nature of surfaces in the system, the length of the components (e.g., the arm), and so forth. The power required, then, will typically be a function of this head, and other factors, such as the flow rates, the type of air mover (e.g., fan, blower, or compressor), and the number of these. It is contemplated that the motor, air mover, components and so forth will be selected and set (or adjustable with ranges) to maintain efficient use of the components, particularly to maintain the air mover within a proper portion of its performance curve.

Figure 16:
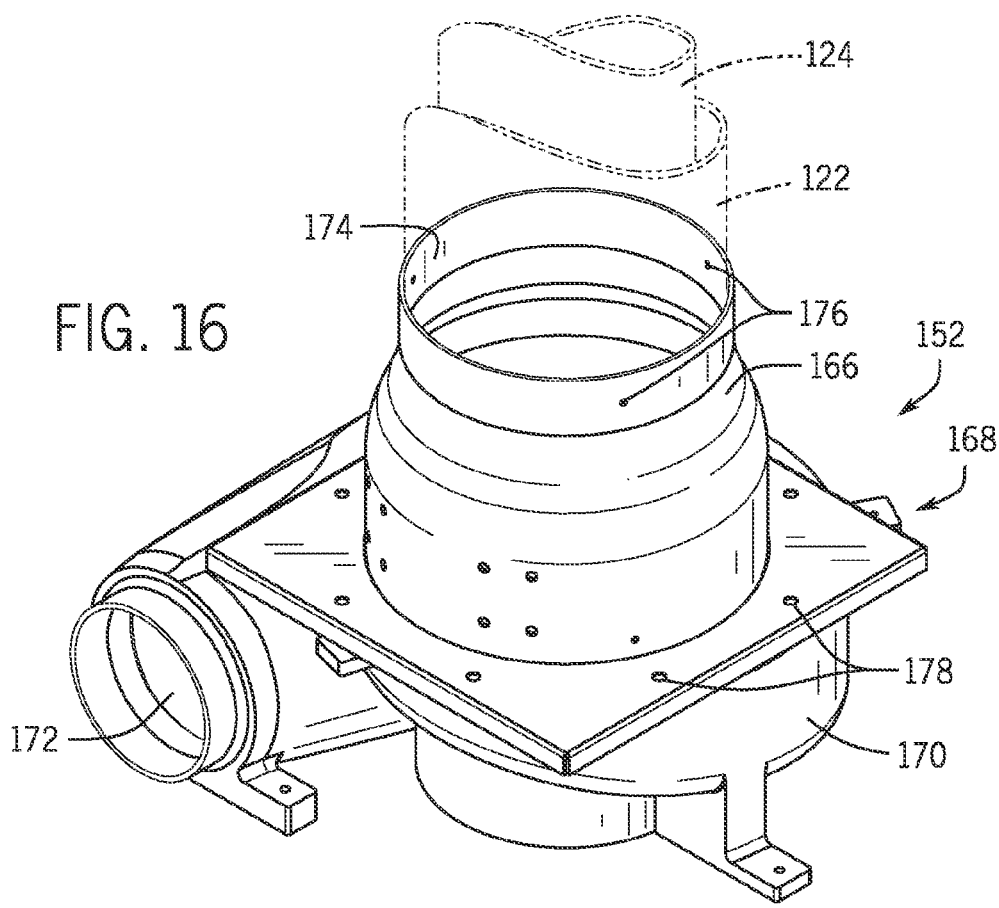

FIGS. 16-20 illustrate a current embodiment for the manifold and support assembly 152 and its constituent parts. The assembly itself is best illustrated in FIG. 16. The assembly includes an adapter 166 that receives the coaxial conduits 122 and 124. The adapter is rotatable with the conduits in embodiments where an arm extends from the base unit and may be rotated. The adapter is captured by a plate assembly 168. An air handler 170 has an inlet 172 for receiving the airstream from the blower and for redirecting the airstream through the annular area between the coaxial conduits. An opening 174 is provided in which the coaxial conduits are fitted. Apertures 176 are provided for receiving fasteners or standoffs that connect the conduit assembly to the adapter.

Figure 17:
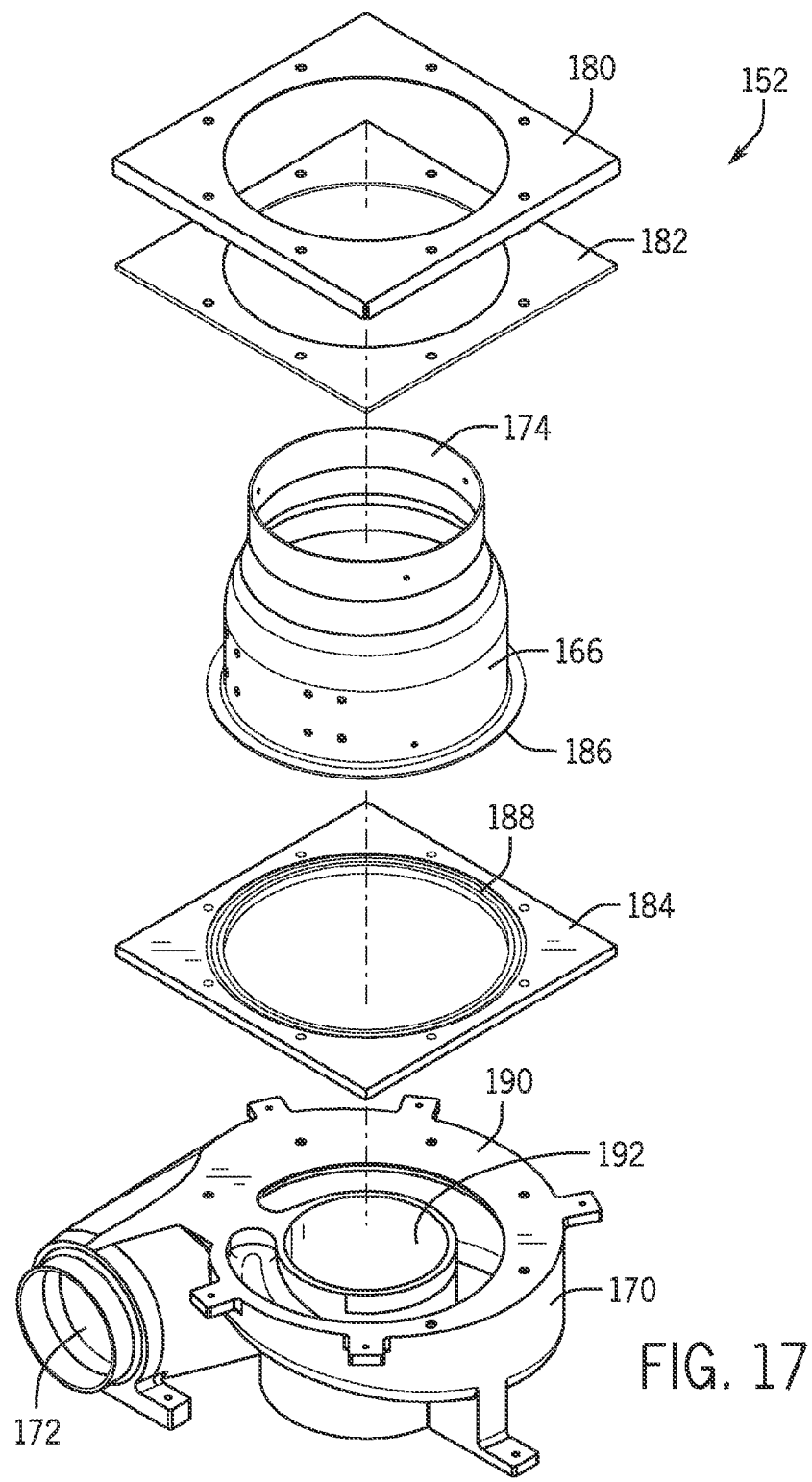

This structure is shown in exploded view in FIG. 17. As shown in FIG. 17, the plate assembly comprises an upper plate 180 and an intermediate place 182. A lower plate 184 is positioned on a lower side of the adapter 166. The adapter has a lower peripheral flange 186 that is positioned in a recess 188 of the lower plate 148. Thus, when the plates are assembled on either side of the adapter, the adapter is effectively captured and supported between the plates, mechanically supporting the arm to which the adapter is connected. The air handler 170 has an upper surface 190 to which the lower plate 148 is mounted during assembly of the system. A central passage 192 is defined through the air handler and serves to receive and communicate with the inner conduit for return flow to the air handler. The inlet 172, again, is adapted to receive flow from the blower and to direct this flow through the annular space between the coaxial conduits.

Figure 18:
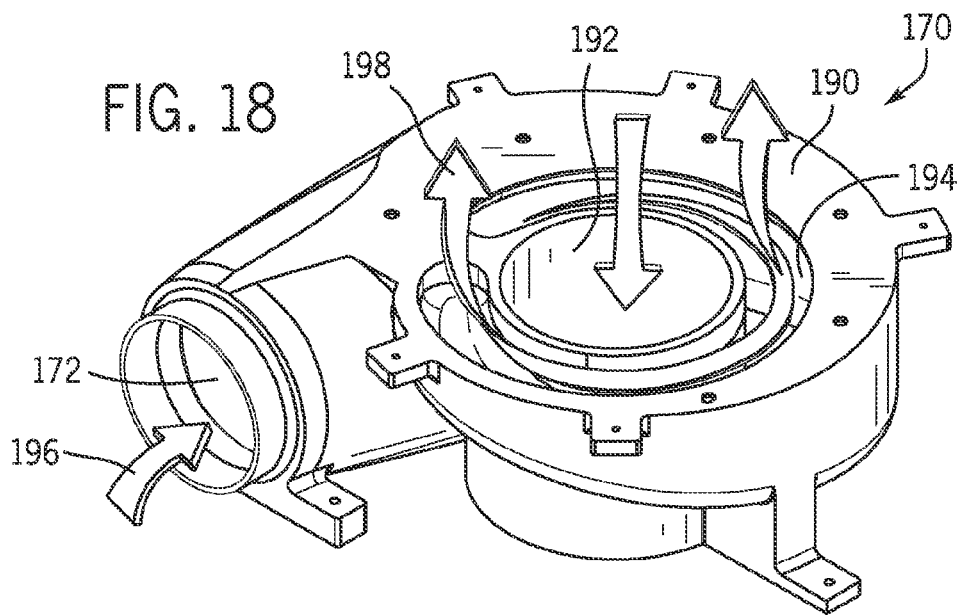

A flow illustration of the air handler 170 is provided in FIG. 18. As shown in FIG. 18, the air handler 170 has an inner or central passage through which return flow is directed. From the inlet 172, the air handler forms a volute passage 194 that efficiently redirects flow from the inlet toward the annular area between the coaxial conduits as described above. The inner flow to the air handler is indicated in FIG. 18 by reference numeral 196. This flow is then redirected through the volute passage as indicated by arrow 198.

FIG. 19 illustrates a present embodiment for mechanically supporting the adapter 166 within the manifold and support assembly. As shown, the adapter has a peripheral flange 186 that is captured between intermediate plate 182 and lower plate 184. Again, lower plate 184 is fixed, in this embodiment, to an upper surface of the air handler. The upper plate 180, then, secures the assembly together and provides mechanical support for the adapter and thereby for the arm. In certain variations, this arrangement may be adapted by addition of seals, bearings, and so forth. As illustrated in FIG. 20, a lower portion of the air handler within the central passage 192 is adapted for sealing engagement of the inner conduit. In this embodiment, two circumferential grooves 200 are provided that may receive seals that are compressed by the air handler and the inner conduit (not shown in FIG. 20). The inner conduit is thus essentially "stabbed" into the air handler at the same time that the outer conduit and adapter are mounted to the cart.

It may be noted that still other adaptations and improvements may also be envisaged for the system. For example, lights, flow sensors, or other components may be provided on the hood to assist in the work performed or in the evaluation or control of the evacuation system. Where such sensors are provided, closed-loop control of motor speeds, valve or louver positions, flow rates, and so forth may be based upon sensed parameters.

It has been found that the foregoing techniques allow for greatly enhanced capture of airborne components, such as particulate matter, smoke, fumes, gases and so forth as compared to existing technologies. In particular, for a given flow rate of gas a target velocity that is useful in capturing such components may be provided in a larger area and further from the nozzle than previously possible. In particular, in a presently contemplated embodiment, a target gas velocity in a capture region was approximately 100 ft/min, for a gas flow rate of approximately 900 CFM. Tests indicated that such velocities could be realized at approximately 3 ft from the nozzle inlet. It is believed that approximately 50 ft/min was achieved at 5 ft from the nozzle inlet. These results were realized with the system described above operating with a 5 Hp motor.

Figure 22:
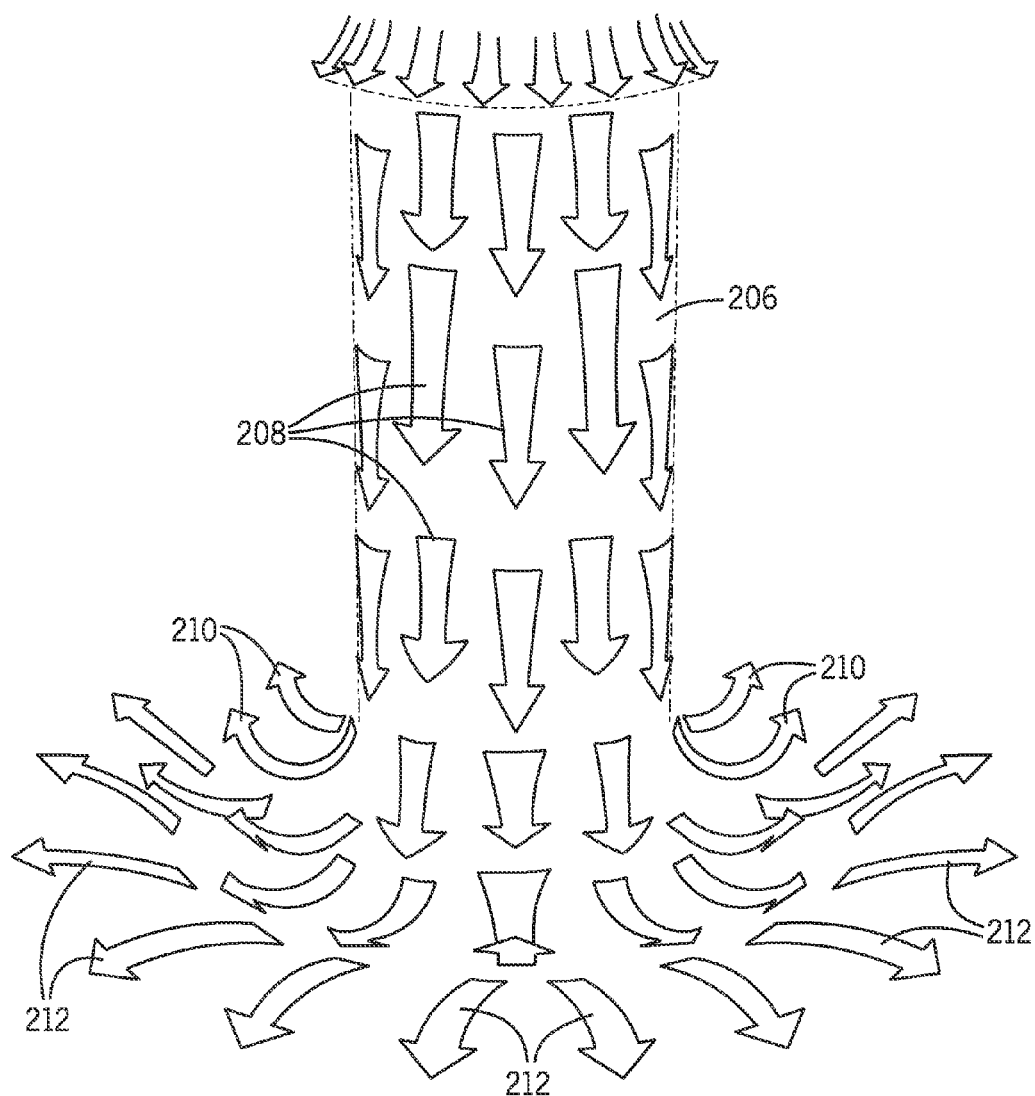
FIGS. 22 and 23 are vector flow diagrams illustrating the flow of gas to and from the nozzle of the system illustrated in the previous figures.
Figure 23:
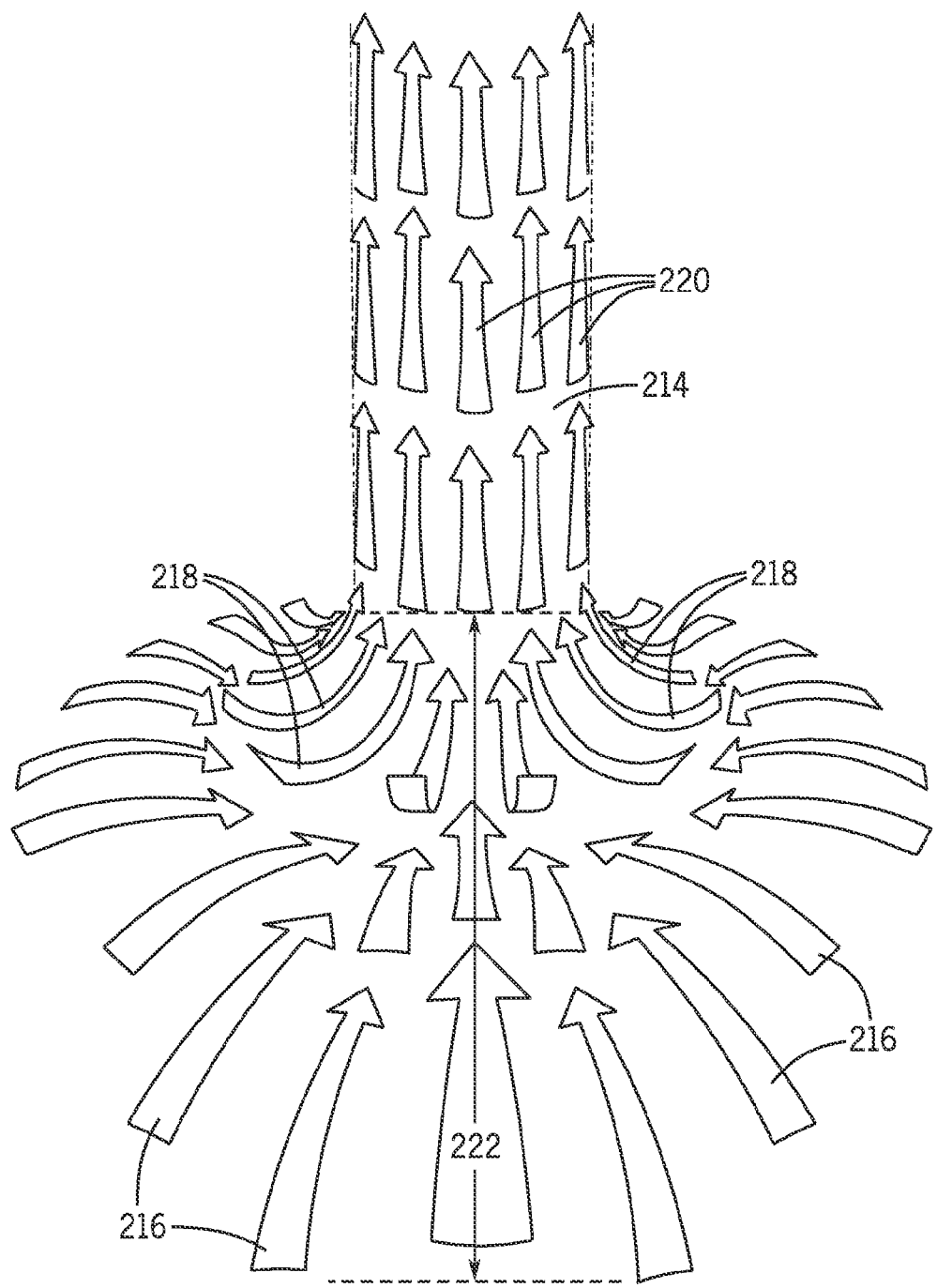

FIGS. 21-23 illustrate this enhanced capture and velocities. In particular, in the illustration of FIG. 21, a cart-type extraction system 10 is shown as described above. The nozzle 20 is positioned near a work area 14. In this example, an operator desired to clear airborne components from the work area. The smaller region 202 represents an approximate limit for the effective capture and extraction of airborne components in prior techniques. The larger region 204 represents the much greater effective capture and extraction region afforded in a current embodiment described above. While the effectiveness of the extraction will depend upon factors such as particle size, the graphic illustration of FIG. 21 has been found to be borne out in actual testing.

FIGS. 22 and 23 are arrow diagrams developed through computer simulation of the same system. As shown in FIG. 22, the positive pressure air stream 206 may be represented by generally parallel flow arrows 208 within the confines of the conduits (not shown). As noted above, in this embodiment, concentric conduits were used, such that the positive pressure air stream 206 is confined in an annular region, although multiple and/or non-concentric conduits may also be used. As the air stream exits the nozzle (not shown), it is diverted radially, as shown by arrows 210. Such diversion is assisted by the geometries of the nozzle elements, as described above. Following deflection, then, the stream diverges, as indicted by arrows 212 to form a region that is generally protected from perturbation, allowing for enhanced capture by the negative pressure air stream. It may be noted that in certain applications, such as welding applications utilizing shielding gases, this region definition may allow for improved component capture, cooling, and other benefits without perturbing the flow and effectiveness of shielding gases used in the welding process.

FIG. 23 illustrates the flow of gas back into the nozzle (again not shown) as part of the negative pressure air stream 214. As indicated by arrows 216, the velocity of gas (and airborne components) begins at some distance from the nozzle entrance, as described above. The gas then converges near the entrance of the nozzle, as indicated by arrows 218, and ultimately is drawn into a generally linear path in the conduits, as indicated by arrows 220. Here again, it has been confirmed through actual testing that desired velocities may be obtained, for a given gas flow rate, at enhanced distances 222 from the nozzle entrance.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An extractor system comprising:
 a single blower having an inlet and an outlet;
 a single motor configured to drive the blower;
 a single positive pressure conduit fluidly coupled to the outlet of the blower, and configured to convey a positive pressure gas stream towards a work area;
 a single negative pressure conduit fluidly coupled to the inlet of the blower, and configured to convey a negative pressure gas stream from the work area, wherein the positive pressure conduit is disposed about the negative pressure conduit in an annular arrangement, and wherein a ratio of flow areas through the positive pressure conduit and the negative pressure conduit is between 4:1 and 0.7:1; and
 a hood coupled to receive the positive pressure gas stream and to direct the positive pressure gas stream around the work area, creating an isolated air region around the work area, and to draw airborne components from the work area into the negative pressure gas stream;
 wherein a flow rate of the negative pressure gas stream always exceeds a flow rate of the positive pressure gas stream, and wherein a ratio of the flow rates of the positive pressure gas stream and the negative pressure gas stream is manually adjustable by a user via an adjustment to alter an airflow from the outlet of the blower into the positive pressure conduit without altering a speed of the motor or the blower.

2. The system of claim 1, wherein the ratio of the flow rates of the positive pressure gas stream and the negative pressure gas stream is approximately 0.8:1.

3. The system of claim 1, wherein a ratio of flow areas through which the positive pressure gas stream and the negative pressure gas stream pass is between 1:1 and 1.5:1.

4. The system of claim 1, wherein the hood comprises an outer element and an inner element with an annular region between the outer and inner elements, the positive pressure gas stream flowing through the annular region.

5. The system of claim 4, wherein the inner element comprises a flange extending beyond the outer element for directing the positive pressure gas stream.

6. The system of claim 4, wherein a ratio of an effective diameter of the inner element to the effective diameter of the outer element is between 0.25 and 0.75.

7. The system of claim 4, wherein a ratio of an effective diameter of the inner element to the effective diameter of the outer element is approximately 0.5.

8. An extractor system comprising:
 a single blower having an inlet and an outlet;
 a single motor configured to drive the blower;
 a single positive pressure conduit fluidly coupled to the outlet of the blower, and configured to convey a positive pressure gas stream towards a work area;
 a single negative pressure conduit fluidly coupled to the inlet of the blower, and configured to convey a negative pressure gas stream from the work area, wherein the positive pressure conduit is disposed about the negative pressure conduit in an annular arrangement; and a hood coupled to receive the positive pressure gas stream and to direct the positive pressure gas stream around the work area, creating an isolated air region around the work area, and to draw airborne components from the work area into the negative pressure gas stream;

wherein the hood comprises an outer element and an inner element with an annular region between the outer and inner elements, the positive pressure gas stream flowing through the annular region, and wherein a ratio of an effective diameter of the inner element to the effective diameter of the outer element is between 0.25 and 0.75 wherein a flow rate of the negative pressure gas stream always exceeds a flow rate of the positive pressure gas stream, and wherein a ratio of the flow rates of the positive pressure gas stream and the negative pressure gas stream is manually adjustable by a user via an adjustment to alter an airflow from the outlet of the blower into the positive pressure conduit without altering a speed of the motor or the blower.

9. The system of claim 8, wherein a ratio of an effective diameter of the inner element to the effective diameter of the outer element is approximately 0.5.

10. The system of claim 8, wherein the inner element comprises a flange extending beyond the outer element for directing the positive pressure gas stream.

11. The system of claim 8, wherein the inner element comprises a flange extending beyond the outer element for directing the positive pressure gas stream.

12. The system of claim 8, comprising an adjustment for adjusting the flow rate of either the positive pressure gas stream or the negative pressure gas stream.

\* \* \* \* \*